Feb. 9, 1932.  A. PIQUEREZ  1,844,595
MOTION TRANSMITTING MECHANISM
Filed April 2, 1930
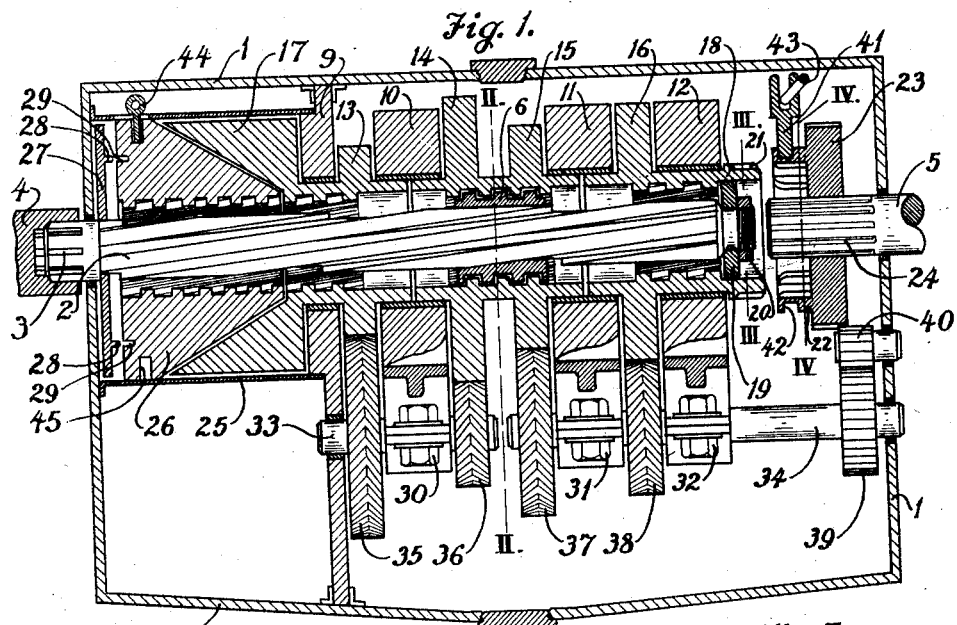
Fig. 1.
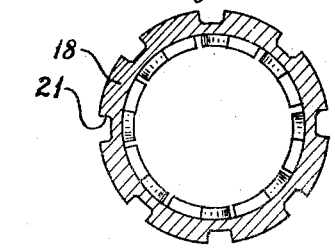
Fig. 3.
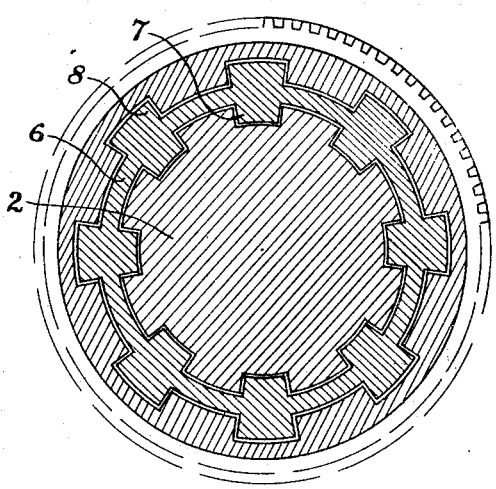
Fig. 2.
Fig. 4.
Inventor
A. Piquerez
By his Attorney
Francis E. Boyce Patented Feb. 9, 1932

1,844,595

UNITED STATES PATENT OFFICE

ACHILLE PIQUEREZ, OF NEW YORK, N. Y.

MOTION TRANSMITTING MECHANISM

Application filed April 2, 1930. Serial No. 440,877.

This invention relates to improvements in motion transmitting mechanism, the principal object of the invention being to provide an improved transmission gearing for motor driven vehicles, in which the gears for all forward speeds are permanently in mesh, whereby the necessity for manually shifting gears when it is desired to change from a lower to a higher speed is entirely eliminated.

Other objects and advantages of the invention will appear as the description proceeds.

In the drawings accompanying this specification,

Fig. 1 is a partly sectional, longitudinal view through the gear case of a motion transmitting gearing embodying the features of the present invention;

Fig. 2 is a transverse sectional view taken approximately on the line II—II of Fig. 1;

Fig. 3 is a transverse sectional view taken on the line III—III of Fig. 1; and

Fig. 4 is a transverse sectional view taken on the line IV—IV of Fig. 1.

The same characters of reference designate the same parts in the different figures of the drawings.

Referring to the drawings, 1 designates a gear case or housing, in which is mounted for rotation a spirally grooved shaft 2, one end of the shaft being supported in a bearing mounted in the front end wall of the housing. The end of the shaft extends beyond the housing wall and is provided with ribs 3 for sliding engagement with interior recesses formed in the wall of a coupling socket 4 carried at the rear end of the usual crank shaft (not shown) of an automobile engine. The shaft 2 thus rotates continuously with the motor crank shaft, but is adapted to have a limited sliding movement relative thereto.

In a bearing in the rear wall of the gear case in alinement with the shaft 2 is supported the front end of the usual propeller shaft 5 for transmitting motion to the differential, said shaft extending into the housing to a point in proximity to the rear end of shaft 2. Mounted directly on shaft 2 is a short sleeve 6, which is provided interiorly and exteriorly thereof with spirally extending ribs 7 and 8 respectively, the interior ribs 7 being in engagement with the grooves of the shaft 2. Mounted for rotation in bearing blocks 9, 10, 11 and 12 and in encircling relation to but spaced from the shaft 2 are a plurality of gears 13, 14, 15 and 16 for transmitting low, intermediate and high speed from the crank shaft to the propeller shaft. The gear 13 has formed integral therewith a hub by which it is supported in the bearings 9 and 10, said hub carrying at its forward end the female member 17 of a cone clutch. The gears 14 and 15 are formed integral with a hub by means of which they are supported in the bearings 10 and 11; and the gear 16 is formed integral with a hub by which it is supported in the bearings 11 and 12. The rear portion of the hub of gear 16 extends through and beyond the bearing 12 as shown at 18 and forms a support for the rear end of shaft 2, on which is mounted a washer 19 that engages the inner wall of the hub extension, the washer being retained on said shaft by means of a nut 20 threaded on the end of the shaft. The hub extension 18 is provided on its periphery with a plurality of spline grooves 21 adapted for engagement with ribs formed at the interior of a flange 22 integral with a gear 23 which is itself splined on the end of the propeller shaft 5 by means of a plurality of ribs 24 formed on the periphery of the shaft and adapted to slide in grooves formed in the gear.

The female clutch member 17 hereinbefore described is enclosed within a secondary housing 25 disposed within the front portion of the main housing 1. This secondary housing also encloses and forms a bearing for a male clutch member 26 adapted to cooperate with the clutch member 17 as hereinafter described. Mounted on the shaft 2 for rotation therewith within the secondary housing 25 is a disk 27 having a pair of laterally projecting pins 28 adapted to engage perforations 29 formed in the clutch member 26.

From the foregoing it will be understood that all of the gears 13 to 16 above described, as well as the clutch members 17 and 26 are normally free from the shaft 2. All of said gears and clutch members, however, are provided with internal spiral grooves adapted to engage the ribs 8 of the sleeve 6 for locking said gears or clutch members to the shaft 2 for rotation therewith, as will be more fully described in connection with the operation of the gearing. It will be observed that the hubs of all of the gears 13—16 are interiorly smooth for portions of their lengths where they abut adjacent hubs. That is to say, at those portions the hubs, instead of being provided with interior grooves, are of sufficient diameter to permit the unobstructed passage of the sleeve 6, the length of which is such that it will engage the spiral grooves of a succeeding gear hub a moment before disengaging those of the preceding hub.

In bearings 30, 31 and 32 disposed in the gear case are mounted for rotation a pair of counter-shafts 33 and 34. On the shaft 33 are secured a pair of gears 35 and 36 which are in constant mesh respectively with gears 13 and 14, while on shaft 34 are secured gears 37 and 38, in constant mesh respectively with gears 15 and 16. The gears 13—16 and 35—38 constitute the forward drive for low and intermediate speeds. The shaft 34 extends through the rear wall of the gear case and carries adjacent to said rear wall a gear 39 in mesh with an idler pinion 40 mounted for rotation in the rear wall of the gear case, said pinion being in position to mesh with gear 23 when the latter is shifted toward the rear for reversing the direction of rotation of the shaft 5. For shifting the gear 23 into and out of engagement respectively with the pinion 40 and the coupling hub extension 18 a yoke 41 is provided, which engages an annular groove 42 in the flange 22 of said gear, said yoke being operatively connected with a pivoted crank 43, which may be operated from the steering column of the vehicle or by means of a special lever (not shown) disposed in convenient reach of the driver. In like manner, a yoke 44 is shown in engagement with an annular groove 45 in the periphery of the clutch member 26, said yoke being perforated for the reception of a suitable rod or cable for operation by the driver.

The operation of the transmission is as follows: In the neutral position, the clutch member 26 is free of the disk 27 and in engagement with the clutch member 17, the sleeve 6 is at its extreme forward position within the clutch member 26, and the gear 23 is out of engagement with both the hub extension 18 and the pinion 40. If the engine is started with the parts in these positions, the shaft 2 will be rotated by reason of its connection with the engine crank shaft, and the sleeve 6, owing to its inertia, will resist rotation with the shaft so that the spiral rib-and-groove connection with the shaft will cause said sleeve to travel on said shaft toward the rear. As soon as the sleeve has engaged the interior spiral groove of the gear 13, this gear will be caused to rotate, because of the difference between the angle of said spiral groove and that of the shaft. If the coupling gear 23 is now shifted into engagement with the hub extension 18, motion will be transmitted through gears 13, 35, 33, 36, 14, 15, 37, 34, 38 and 16, to the propeller shaft 5, thus causing the vehicle to move forward at low speed. Upon acceleration of the engine speed the sleeve will continue to travel until it releases the gear 13 and engages the spiral grooves in the hub of gears 14 and 15, whereupon motion at intermediate speed will be transmitted by way of gears 15, 37, 38 and 16 to the propeller shaft. Further acceleration of the engine speed will cause the sleeve to pass out of engagement with gears 14 and 15 and into engagement with the grooves in the hub of gear 16, which gear will thus be locked to the shaft 2, so that motion at engine or high speed will be imparted to the propeller shaft by way of its direct connection with the hub extension 18. Inasmuch as the sleeve cannot pass beyond the hub of gear 16, the direct high-speed drive of the propeller shaft will continue as long as the high speed of the motor is maintained. For reversing the direction of motion of the propeller shaft 5, and thus of the vehicle, the gear 23 is shifted into mesh with pinion 40, preferably when the sleeve 6 is in engagement with the hub of the low-speed gear 13, so that motion in the reverse direction will be imparted by way of gears 13, 35, 36, 14, 15, 37, 39, 40 and 23 to the shaft 5. It will be obvious, however, that the reverse motion can be stepped up to high speed in the same manner as the forward motion if it should be found desirable to do so.

As hereinbefore stated, the shaft 2 is capable of longitudinal movement to a limited extent. This movement is effected upon initiation of the return movement of the sleeve toward its low-speed position, for the reason that upon reduction of the speed of the motor shaft and consequently that of shaft 2 the high speed of the vehicle will be transmitted to the hub extension 18 of gear 16. This change in the relative speeds of rotation of the gear hub and the shaft 2 will cause the sleeve to "back out" of the hub. However, because of the difference in angularity between the ribs 7 and 8, the effort of the sleeve to reverse its direction of travel on the shaft will exert a "pull" on said shaft, causing it to move toward the rear thereby carrying the disk 27, which is secured on the forward portion of the shaft, into abutting relation with the clutch member 26 so that the pins 28 will enter the openings 29 in said clutch member and the latter carried into frictional engagement with the cooperating clutch member 17. With the clutch members and disk thus engaged the speed of rotation of the propeller shaft will be immediately checked by reason of the fact that the disk 27 can rotate no faster than the shaft 2 and this speed of rotation will act through the clutch members and the intermediate gears to resist the tendency of the propeller shaft to rotate faster than the shaft 2. The same action will take place at any time the driver of the vehicle, because of failure of brakes or otherwise, should lose control of the vehicle while descending a steep hill for instance. In this way the engine is automatically caused to act as a brake and without any manual operation on the part of the driver of the vehicle.

It will, of course, be understood that the ratio of the gears is intended to be such as to impart a progressively faster speed of rotation to the propeller shaft as the sleeve passes from one gear to the next during its travel from front to rear of the shaft 2. It will also be understood that while I have shown the gear teeth as of the hearringbone type, which form of gearing is preferable because it is practically noiseless, this feature is not an essential part of the invention, since the ordinary straight toothed gearing may be used without departure from the spirit and scope of the invention as set forth in the appended claims. It will further be understood that the propeller shaft will be equipped with the usual universal joints.

Having thus described my invention, what I claim is:

1. Motion transmitting mechanism comprising, a rotatable solid shaft, a series of gears disposed in concentric relation to said shaft, and normally out of contact therewith, a sleeve disposed on the shaft for reciprocatory movement between the shaft and said gears, cooperating means carried by said shaft and sleeve and effective to cause rotation and axial movement of said sleeve during rotation of the latter, and cooperating means carried by said sleeve and gears and effective to cause rotary motion of the successive gears during the axial movement of the sleeve.

2. Motion transmitting mechanism comprising, a rotatable shaft, a series of gears disposed in concentric relation to said shaft, and normally out of contact therewith, and a sleeve disposed on said shaft and having a spiral rib and groove connection therewith thereby to cause rotation and axial movement of said sleeve on the shaft during rotation of the latter, said sleeve and gears having cooperating spiral engaging means of different angularity from that of the shaft thereby to cause rotation of successive gears during axial movement of said sleeve.

3. The combination with a driving shaft and a driven shaft, of an intermediate shaft coupled to said driving shaft for rotation therewith, a series of gears disposed in concentric relation to and normally out of contact with said intermediate shaft, a member mounted on said intermediate shaft for rotation therewith, cooperating means carried by said member and shaft to cause axial movement of the member on said shaft during rotation of the latter, cooperating means carried by said member and said gears for engaging successive gears during axial movement of the member thereby to rotate said gears, means for coupling said driven shaft for rotation with one of said gears, a second series of gears in mesh with the gears of the first series, the ratio of the gears being such as to transmit motion to the driven shaft at progressively higher speeds as the movable member engages successive gears during its axial movement in one direction, and means automatically operative to prevent rotation of the driven shaft at a speed higher than that of the driving shaft, said means being effective simultaneously to initiate the return axial movement of said gear-engaging member.

4. The combination with a driving shaft and a driven shaft, of an intermediate shaft coupled to said driving shaft for rotation therewith and axial movement relative thereto, said intermediate shaft having in its periphery a plurality of spiral grooves, a series of gears disposed in concentric relation to and spaced from said intermediate shaft, said gears having hubs provided with spiral grooves, a sleeve mounted on said shaft and having interior spiral ribs engaging the grooves of the shaft and exterior spiral ribs adapted to engage the grooves of said gears whereby on rotation of said intermediate shaft the sleeve will rotate therewith and move axially thereon thereby to engage the successive gears of the series, means for coupling said driven shaft for rotation with one of said gears, a second series of gears in mesh with the gears of said first series, the ratio of the gears being such as to transmit motion to the driven shaft at progressively higher speeds as the sleeve engages successive gears, means secured on said intermediate shaft for rotation therewith and adapted to lock one of said gears for rotation with the shaft, means for limiting the axial movement of said sleeve, the interior and exterior ribs on the sleeve being disposed at different angles whereby excess speed of the driven shaft will exert axial pressure on said intermediate shaft thereby to move the same axially and carry its gear-locking means into operation and simultaneously initiate the return axial movement of said sleeve.

5. The combination with a driving shaft and a driven shaft, of an intermediate shaft coupled to said driving shaft for rotation therewith, a series of gears disposed in concentric relation to and normally out of contact with said intermediate shaft, a sleeve mounted on said intermediate shaft for axial movement between the shaft and gears, cooperating means carried by said sleeve and shaft to cause axial movement of the sleeve on said shaft during rotation of the latter, cooperating means carried by said sleeve and said gears for engaging successive gears during axial movement of the sleeve thereby to rotate said gears, means for coupling said driven shaft for rotation with one of said gears, a second series of gears in mesh with the gears of the first series, the ratio of the gears being such as to transmit motion to the driven shaft at progressively higher speeds as the movable sleeve engages successive gears during its axial movement in one direction, and shiftable means for reversing the direction of rotation of said driven shaft.

6. The combination with a driving shaft and a driven shaft, of an intermediate shaft coupled to said driving shaft for rotation therewith and axial movement relative thereto, said intermediate shaft having in its periphery a plurality of spiral grooves, a series of gears disposed in concentric relation to and spaced from said intermediate shaft, said gears having hubs provided with spiral grooves and one of said gears having a clutch member integral therewith, a cooperating shiftable clutch member mounted for rotation in encircling relation to and spaced from said intermediate shaft, said clutch members having interior spiral grooves, a sleeve mounted on said shaft and having interior spiral ribs engaging the grooves of the shaft and exterior spiral ribs adapted to engage the grooves of said gears and clutch members whereby on rotation of said intermediate shaft the sleeve will rotate therewith and move axially thereon thereby to engage the successive gears of the series, means for coupling said driven shaft for rotation with one of said gears, a second series of gears in mesh with the gears of said first series, the ratio of the gears being such as to transmit motion to the driven shaft at progressively higher speeds as the sleeve engages successive gears, a disk secured on said intermediate shaft for rotation therewith and having means for engaging said shiftable clutch, means for limiting the axial movement of said sleeve, the interior and exterior ribs on the sleeve being disposed at different angles whereby excess speed of the driven shaft will exert axial pressure on said intermediate shaft thereby to move the same axially and carry its disk into engagement with the shiftable clutch member and the latter into frictional engagement with its cooperating clutch member.

In testimony whereof I have signed my name to this specification.

ACHILLE PIQUEREZ.